United States Patent
Jeong

Patent Number: 5,177,598
Date of Patent: Jan. 5, 1993

[54] MULTIPAGE DISPLAY APPARATUS OF TELETEXT RECEIVING SYSTEM

[75] Inventor: Tae-hwa Jeong, Kyunggi, Rep. of Korea

[73] Assignee: Samsung Electronics Co., Ltd., Kyunggi, Rep. of Korea

[21] Appl. No.: 721,404

[22] Filed: Jun. 26, 1991

[30] Foreign Application Priority Data

Jun. 30, 1990 [KR] Rep. of Korea .................. 90-9523

[51] Int. Cl.⁵ ............................................. H04N 7/08
[52] U.S. Cl. .................................. 358/21 R; 558/147; 558/183; 558/22
[58] Field of Search ............ 358/142, 146, 147, 21 R, 358/183, 22

[56] References Cited

U.S. PATENT DOCUMENTS

| 5,008,750 | 4/1992 | Gomilkawa | 358/183 |
| 5,010,406 | 4/1991 | Kawakami et al. | 358/183 |
| 5,109,279 | 4/1992 | Ando | 358/183 |

FOREIGN PATENT DOCUMENTS

| 0027573 | 3/1981 | Japan | 358/183 |
| 0186085 | 8/1991 | Japan . | |
| 0258180 | 11/1991 | Japan . | |

Primary Examiner—James J. Groody
Assistant Examiner—David E. Harvey
Attorney, Agent, or Firm—Cushman, Darby & Cushman

[57] ABSTRACT

Disclosed is a multipage display apparatus which divides one screen into several sections so as to display a plurality of pages at the same time. The apparatus comprises a microprocessor, a teletext unit for outputting signals R, G and B in unit of one page, a first encoder for encoding the signals R, G and B and outputting a composite video signal in the normal mode, luminance and chrominance difference signal separators, a controller and a memory unit for reading and writing the converted digital luminance and chrominance difference signals, a second encoder for encoding information read out all at once from the memory and outputting a composite video signal of a multipage mode, a window signal generator for receiving a synchronizing signal from the synchronizing and sampling frequency separator and generating a window signal, and a switch unit in which the composite video signal of either a normal mode or a multipage mode is selected by the window signal. In the apparatus, a plurality of pages are displayed at once on one screen divided into several smaller sections, thereby improving the efficiency of information search.

4 Claims, 3 Drawing Sheets

9 PAGES

2 PAGES

9 PAGES

1 PAGE

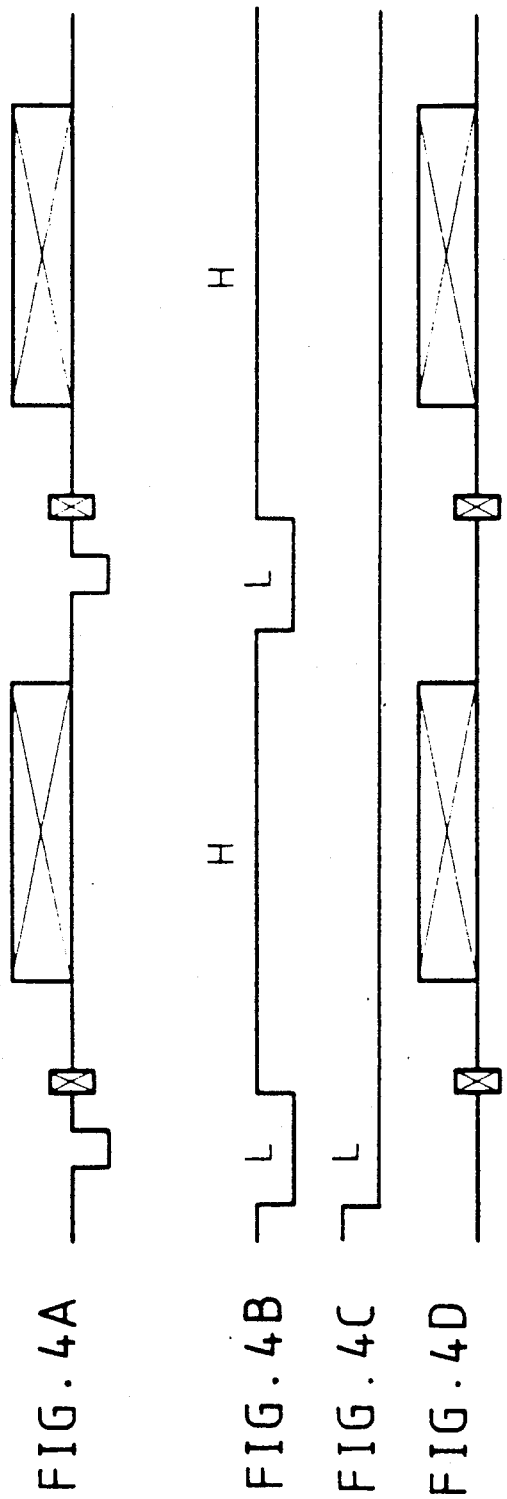

MULTIPAGE DISPLAY APPARATUS OF TELETEXT RECEIVING SYSTEM

BACKGROUND OF THE INVENTION

The present invention relates to a teletext receiving system and more particularly to a multipage display apparatus which divides a screen into several sections so as to display several pages at the same time when a teletext broadcast is received.

In a conventional teletext receiving apparatus, a user selects a page from an index screen and the selected page is displayed on a screen. In this case, when the amount of information on a selected page exceeds that which can be displayed on a single screen, the user presses a sub-page selection key, so that the remainder of the selected pages which cannot be displayed, appear on the following screens.

Since the conventional apparatus can display only one page per screen, to display a plurality of pages on a single screen, the page selection key needs to be pressed for each page in order to display that page, and consumes an excessive amount of time in searching for information.

SUMMARY OF THE INVENTION

Accordingly, it is an object of the present invention to provide a multipage display apparatus which divides a screen into several sections so as to display a plurality of pages having information to be displayed, on a single screen with several sections at the same time.

Also, such a multipage display apparatus displays much information on a screen of several divided sections at the same time, thereby providing an effective information search function which can quickly search the information.

To achieve the object, the present invention comprises:

a microprocessor for controlling a teletext receiving system and for processing data;

a tuner for selecting a channel under the control of the microprocessor;

a teletext unit for receiving a composite video signal through the channel selected by the tuner, and sequentially outputting information corresponding to each page in synchronization with a clock signal generated in the microprocessor;

a first encoder for encoding signals R, G and B outputted from the teletext unit and outputting a composite video signal;

a synchronizing and sampling frequency separator for receiving the composite video signal outputted from the first encoder and separating the synchronizing signal and a sampling frequency;

a window signal generator for receiving the separated vertical and horizontal synchronizing signals from the synchronizing and sampling frequency separator and generating a control signal under the control of the microprocessor so as to select a normal or a multipage mode;

a luminance signal separator for separating a luminance signal from the composite video signal which is an output of the first encoder;

a chrominance difference signal separator for separating a chrominance difference signal from the composite video signal which is an output of the first encoder;

a multiplexer for selectively outputting the luminance signal and the chrominance difference signals supplied from the luminance signal separator and the chrominance difference signal separator, respectively;

an A/D converter for converting a signal outputted from the multiplexer into a digital signal and outputting the converted digital signal;

a controller for receiving horizontal and vertical synchronizing signals outputted from the synchronizing and sampling frequency separator and a luminance signal and a chrominance difference signals outputted from the A/D converter, and controlling the write-in and the read-out of the luminance signal and the chrominance difference signals under the control of the microprocessor;

a memory unit in which the luminance and chrominance difference signals outputted from the A/D converter are written in and are read out under the control of the controller;

a D/A converter for converting the luminance and chrominance difference signals read out from the memory unit into analog signals and outputting the converted analog signals;

a second encoder for receiving the luminance signal and the chrominance difference signals outputted from the D/A converter, converting them into a composite video signal, and outputting the converted composite video signal; and a switch unit for selectively outputting one of the composite video signals outputted from the first and second encoders, by the control signal outputted from the window signal generator.

BRIEF DESCRIPTION OF THE DRAWINGS

The above objects and other advantages of the present invention will become more apparent by describing the preferred embodiment of the present invention with reference to the attached drawings, in which:

FIGS. 4A through 4C are output waveform diagrams of signals supplied to the switch of the apparatus shown in FIG. 1.

DETAILED DESCRIPTION OF THE INVENTION

Figure 1:
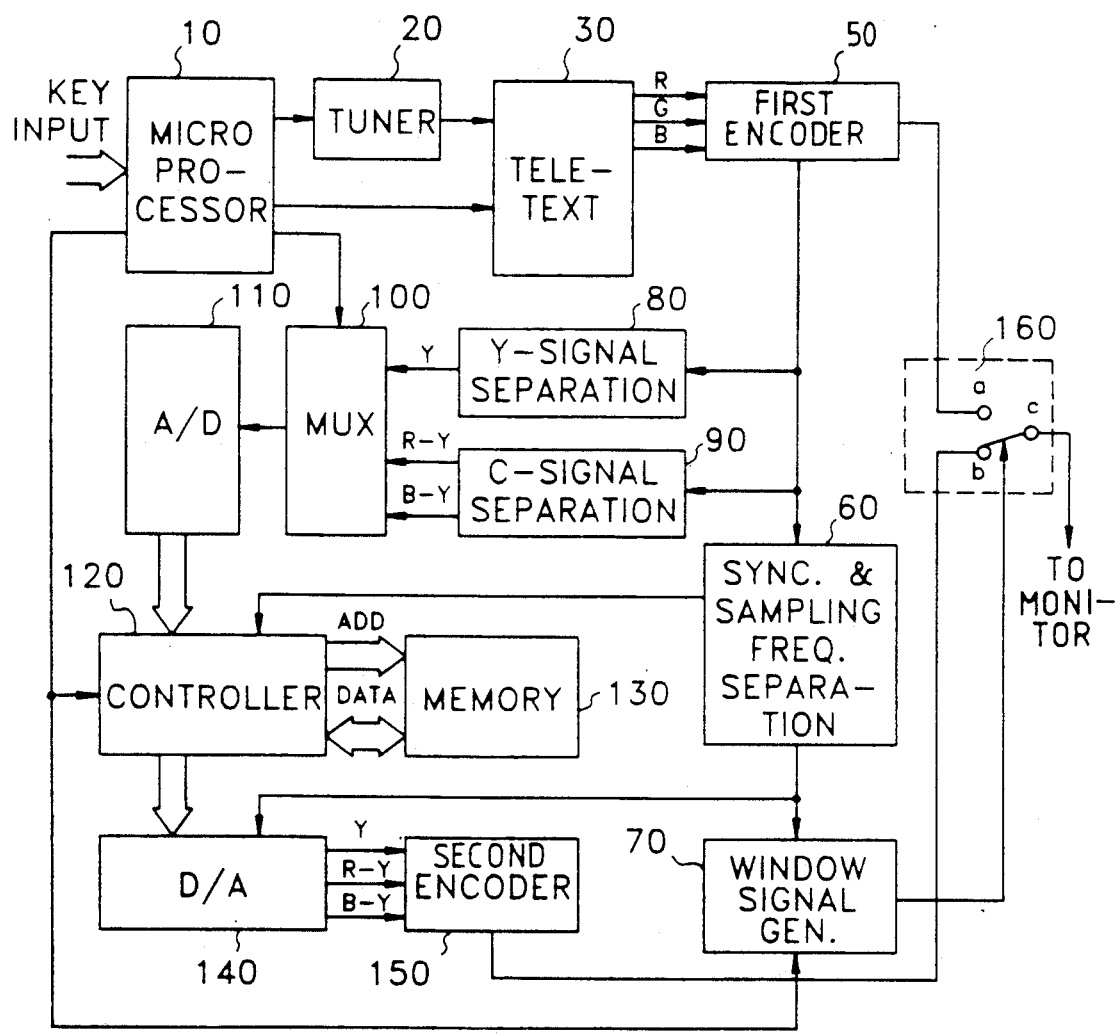
FIG. 1 is a block diagram showing an embodiment of a multipage display apparatus according to the present invention.

First, an embodiment of a multipage display apparatus according to the present invention is explained referring to FIG. 1.

When a microprocessor 10 does not receive a multipage key signal from the key input not shown, a normal mode is determined and then the microprocessor 10 commands the tuner 20 to select a channel so that a composite video signal can be transmitted to the teletext unit 30 via the selected channel. Also at this time, the microprocessor 10 supplies a clock signal to the teletext unit 30.

The teletext unit 30 receives both the composite video signal transmitted through the channel selected by tuner 20 and the clock signal supplied from the microprocessor 10, and then separates the composite video signal into signals R, G and B and outputs the separated signals.

A first encoder 50 encodes the signals R, G and B outputted from the teletext unit 30, and outputs the composite video signal to one input terminal a of a switch unit 160. During the normal mode, the microprocessor 10 instructs the controller 120 not to be operated, at the same time, the microprocessor 10 instructs a window signal generator 70 to output a window signal of a constant low state. Accordingly, an output terminal c of the switch unit 160 is connected to the input terminal a, so that a composite video signal of normal mode is outputted from the switch unit 160.

Similarly, when the microprocessor 10 does receive a multipage key signal from the key input, a multipage mode is determined and then the microprocessor 10 commands the tuner 20 to select a channel so that a composite video signal can be transmitted to the teletext unit 30 via the selected channel. Also at this time, the microprocessor 10 supplies a clock signal to the teletext unit 30.

The teletext unit 30 separates the composite video signal into signals R, G and B, and then sequentially outputs the respective information corresponding to each page to a first encoder 50.

The first encoder 50 encodes the input signals R, G and B to output a composite video signal.

A luminance signal separator 80 receives the composite video signal outputted from the first encoder 50, and separates a luminance signal Y. A chrominace difference signal separator 90 receives the composite video signal and separates the chrominance difference signals R-Y and B-Y from the composite video signal.

The multiplexer 100 sequentially selects and outputs the luminance signal Y and the chrominance difference signals R-Y and B-Y outputted from the luminance signal separator 80 and the chrominance difference signal separator 90, respectively, by a control signal supplied from the microprocessor 10.

An A/D converter 110 converts the signal outputted from the multiplexer 100 into a digital signal, and then outputs the converted digital signal.

The luminance and chrominance difference signals outputted from the A/D converter 110 are sequentially written page by page in a memory unit 130 under the control of the controller 120.

At this time, the controller 120 is operated by a command signal outputted from the microprocessor 10.

Figure 2C:
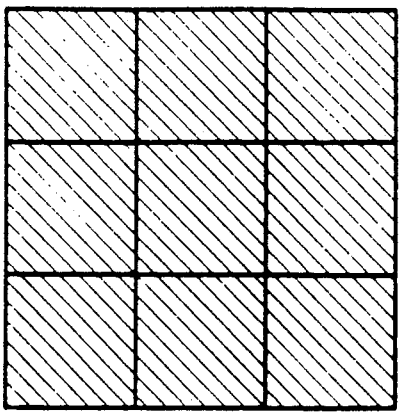
FIG. 2A through 2C are views showing the data write-in state in the apparatus shown in FIG. 1.
Figure 2B:
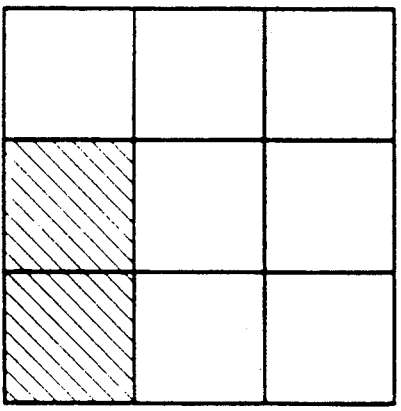
Figure 3:
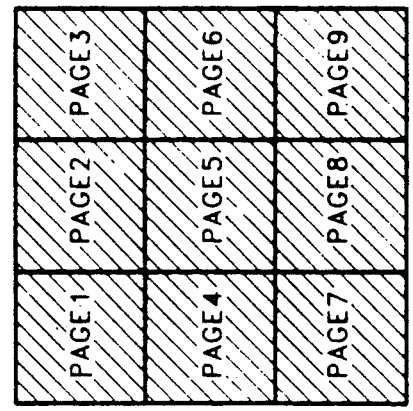
FIG. 3 is a view showing the data read-out state in the apparatus shown in FIG. 1.
Figure 2A:
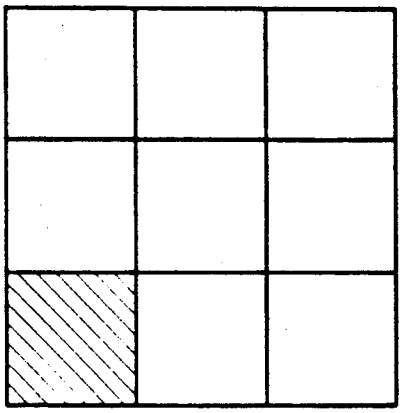

FIGS. 2A through 2C show how data is sequentially written page by page in the memory unit 130, and the amount of information written in the memory unit 130 corresponds to a predetermined number of pages inputted at the key input. The data from A/D converter 110 are written into memory unit 130 according to the address signals ADD supplied from the controller 120 as shown in FIGS. 2A through 2C, and, as shown in FIG. 3, the above data are read out all at once from memory 130 according to the address signals ADD supplied from the controller 120.

The information read out as described above is supplied to a D/A converter 140 via the controller 120 and is then converted into an analog signal.

The luminance signal Y and the chrominance difference signals R-Y and B-Y outputted from the D/A converter 140 are supplied to a second encoder 150.

The second encoder 150 encodes the input luminance and chrominance difference signals, and then outputs a composite video signal for displaying each sub-page on each screen section to the outer input terminal b of the switch unit 160.

The window signal generator 70 generates a window signal as shown in FIG. 4B according to the supply of the vertical and horizontal synchronizing signals from the synchronizing and sampling frequency separator 60 when the multipage mode command signal is supplied from the microprocessor 10 the window signal generator 70. Conversely, when the multipage mode signal is not supplied, the window signal generator 70 outputs a constant "LOW" signal as shown in FIG. 4C.

The window signal is applied to the switch unit 160. Accordingly, the switch unit 160 selects the output of the first encoder 50 when the window signal is low, while the switch unit 160 selects the output of the second encoder 150 when the window signal is high. Thus, the selected signal is supplied to the monitor (not shown) through an output terminal C in the switch unit 160.

FIGS. 4A through 4D show the output signal of the first encoder 50, the window signal in the multipage mode, the window signal in the normal mode, and the output signal of the second encoder 150, respectively. While the window signal is low, the one input terminal a, to which the output of first encoder 50 is output, is connected to the output terminal c of the switch unit 160, through which a synchronizing signal within a composite video signal of a normal mode is outputted. Conversely, while the window signal is high, the other input terminal b, to which the output of second encoder 150 is input, is connected to the output terminal c of the switch unit 160, through which a composite video signal of a multipage mode is outputted.

Thus, when the window signal of FIG. 4B is supplied to the switch unit 160, the composite video signal of multipage mode having no synchronizing signal as shown in FIG. 4D is outputted including the synchronizing signal within the composite video signal of normal mode shown in FIG. 4A.

Thus, the composite video signal outputted from the switch unit 160 displays the information corresponding to the number of pages inputted via the key input on a screen which is divided into several sections.

As described above, the present apparatus divides one screen into several sections to display a plurality of pages at the same time, thereby solving the inconvenience of displaying pages one at a time on a screen by repeatedly pressing a page selection key and also improving the efficiency of the information search because much information is shown at the same time.

What is claimed is:

1. A multipage display apparatus comprising:
a microprocessor for controlling a teletext receiving system and processing data;
a tuner for selecting a channel under the control of said microprocessor;
a teletext unit for receiving a composite video signal through the channel selected by said tuner, and sequentially outputting information corresponding to each page in synchronization with a clock signal generated in said microprocessor;
first encoder for encoding signals R, G and B outputted from said teletext unit and outputting a composite video signal;
a synchronizing and sampling frequency separator for receiving the composite video signal outputted from said first encoder and separating a synchronization signal and a sampling frequency;
a window signal generator for receiving the separated vertical and horizontal synchronizing signals from said synchronizing and sampling frequency separator and generating a control signal under the control of said microprocessor so as to select a normal or a multipage mode;

a luminance signal separator for separating a luminance signal Y from the composite video signal which is an output of said first encoder;

a chrominance difference signal separator for separating chrominance difference signals from the composite video signal which is an output of said first encoder;

a multiplexer for selectively outputting the luminance signal and the chrominance difference signals supplied from said luminance signal separator and said chrominance difference signal separator, respectively;

an A/D converter for converting a signal outputted from the multiplexer into a digital signal and outputting the converted digital signal;

a controller for receiving the horizontal and vertical synchronizing signals outputted from said synchronizing and sampling frequency separator and the luminance and chrominance difference signals outputted from said A/D converter, and controlling the write-in and the read-out of said luminance and chrominance difference signals under the control of said microprocessor;

a memory unit in which the luminance and chrominance difference signals outputted from said A/D converter are written in and are read out under the control of said controller;

a D/A converter for converting the luminance and chrominance difference signals read out from said memory unit into analog signals and outputting the converted analog signals;

a second encoder for receiving the luminance signal and the chrominance difference signals outputted form said D/A converter, respectively, converting into a composite video signal, and outputting the converted composite video signal; and a switch unit for selectively outputting composite video signals supplied from said first and second encoders, by the control signal outputted from said window signal generator.

2. A multipage display apparatus as claimed in claim 1, wherein said controller sequentially stores said luminance and chrominance difference signals outputted from said A/D converter, page by page in said memory unit, and reads out information corresponding to the predetermined number of pages all at once from said memory unit, in accordance with a command signal of said microprocessor.

3. A multipage display apparatus as claimed in claim 2, wherein during multipage mode, said switch unit selects and outputs a synchronizing signal from a composite video signal of a normal mode outputted from said first encoder when the control signal outputted from said window signal generator is in a "LOW" state, and outputs a composite video signal of a multipage mode outputted from said second encoder when the control signal is in a "HIGH" state.

4. A multipage display apparatus as claimed in claim 3, wherein said window signal generator outputs a control signal having a constant "LOW" state if a multipage mode command signal is not supplied from said microprocessor.

* * * * *